«2,954,363

STABILIZED MASSES OF POLYVINYL COMPOUNDS CONTAINING HALOGEN

Walther Kuehne, Mannheim, Heinz Pohlemann, Ludwigshafen (Rhine), and Hans Krzikalla, Heidelberg, Germany, assignors, by mesne assignments, to Deutsche Advance Produktion G.m.b.H., Koln (Rhine), Germany, a corporation of Germany No Drawing. Filed June 18, 1957, Ser. No. 666,473

6 Claims. (Cl. 260—45.75)

This invention relates to the stabilizing of polyvinyl compounds containing halogen. More particularly the invention relates to the use of new stabilizers containing dialkyl tin mercaptides.

The methods hitherto usual for stabilizing polyvinyl chlorides and copolymers of vinyl chloride with heavy metal compounds, in particular lead salts, lead almost exclusively to cloudy masses because they and their decomposition product are insoluble in the polymers. Moreover large amounts of the heavy metal compound are usually employed, for example about 2 to 8% by weight, in order to achieve the high resistance values with simultaneous high thermal stability which are required for example in softener-containing polyvinyl chloride extrusion masses for electrical insulation of wires and cables.

In the stabilization of softener-free masses of polyvinyl chloride or copolymers of vinyl chloride with other vinyl compounds, which are to be subjected to high temperatures, relatively large additions of the usual metal stabilizers are also necessary, for example in the case of masses which are to be worked up by injection moulding methods.

On the contrary, for example, cadmium compounds and in particular organo-tin compounds or their combinations with alkaline earth metal and epoxy compounds and are more effective in so far as by reason of their solubility in the vinyl chloride polymers they usually yield clear transparent masses of very high stability to light and heat; the additions necessary for this purpose are usually about 3 to 5% by weight. Their use in masses which are subjected to high electrical stress, for example for the insulation of wire and cables, is however limited by the said solubility and by a certain electrical conductivity. In particular the initial useful resistance values of such coating masses fall more or less rapidly by reason of the decomposition products formed.

We have now found that especially highly stabilized masses are obtained from halogen-containing polyvinyl compounds and/or their copolymers by incorporating therein up to one percent of a dialkyl tin mercaptide of the general formula:

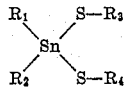

in which $R_1$, $R_2$, $R_3$ and $R_4$ represent identical or different alkyl radicals containing not more than about 18 carbon atoms and a heavy metal compound.

Suitable halogen-containing polyvinyl halide compounds are for example polymers of vinyl chloride or its copolymers with vinylidene chloride, vinyl acetate or vinyl propionate, and also butadiene-containing mixtures with polyvinyl chloride.

As dialkyl tin dimercaptides there come into question in particular: dibutyl tin di-octadecylmercaptide, dibutyl tin bis-dodecylmercaptide, dibutyl tin di-octylmercaptide, dioctyl tin di-octylmercaptide, dioctyl tin bis-dodecylmercaptide, dioctyl tin dihexylmercaptide, bis-dodecyl tin dihexylmercaptide, didecyl tin dioctylmercaptide and bis-dodecyl tin bis-dodecylmercaptide.

Among heavy metal compounds there are suitable beside the cadmium compounds, for example cadmium stearate, in particular basic lead compounds and lead carbonate. Other known lead stabilizers are tribasic lead sulfate, tribasic lead maleate, dibasic lead phthalate, basic lead silicate-sulfate, basic lead chlorosilicate, dibasic lead phosphite, lead salicylate, lead cyanamide, basic and neutral lead stearate or ricinoleate and cadmium stearate.

Surprisingly, the incorporation of the two types of stabilizer, even in relatively small proportions by weight of dialkyl tin dimercaptides, as for example amounts of up to 1% by weight, and the same or multiple amount, for example 5 to 10 times the amount, of the heavy metal compounds, results in stability values which are often double or more than double those of the tin-free comparative samples with the same lead content. It is remarkable that the high resistance values of the vinyl polymer masses thus stabilized are maintained, like those of the tin-free comparative samples.

It has been found to be especially advantageous to incorporate relatively small amounts of the tin stabilizer during the preparation of the halogen-containing vinyl polymer and then later to add the heavy metal compound to the only slightly pre-stabilized product, the mixture then being worked up in the usual way.

The stabilized masses thus obtained, especially when using in all only small amounts of stabilizers, are in general pale in colour and have very high stability to heat and light while at the same time having good electrical insulating properties. They may be worked up for example without softener to pale-coloured injection moulding masses, to almost transparent foils, or also to hollow bodies. Phonograph discs with noise-free sound reproduction may also be prepared on the basis of halogen-containing copolymers.

The following example will further illustrate this invention but the invention is not restricted to this example.

*Example*

A mixture of 75 parts by weight of a polyvinyl chloride (K-value about 70) prepared by a suspension method, 25 parts by weight of dioctyl phthalate and 0.2 part by weight of a purified montan wax (as lubricant) are rolled for 10 minutes at 160° C. and the heat stability of a sample of the rolled-out foil tested at 175° C. by the method of Meixner (1).

For comparison, a similar batch (2) of a polyvinyl chloride which already contains 0.2% by weight of dioctyl tin bis-dodecylmercaptide is rolled.

Finally the two batches of tin-free and tin-containing polyvinyl chloride are repeated and 2.25 parts of tribasic lead sulfate added. The tin-free product is (3) and the tin-containing product is (4).

The heat stabilities of these four rolled foil samples are shown as "Time In Minutes" values in the following table. In the same table there are also shown the results of similar experiments with polyvinyl chloride with a different pre-stabilization (other tin stabilizers) and with other lead compounds. At the intersections of the individual series, the stability times of the combinations are shown, these thus containing both lead and tin stabilizers.

| Foil (1) of the Example; free from tin and lead. Stability: 12 | Lead-free foils of the Example derived from polyvinyl chloride with— | | |
|---|---|---|---|
| | 0.2% by weight of dioctyl tin dodecylmercaptide. Stability: 34 | 0.2% by weight of dibutyl tin dodecylmercaptide. Stability: 30 | 0.3% by weight of dibutyl tin dodecylmercaptide. Stability: 48 |
| Tin-free foil (3) with 3% by weight of tribasic lead sulfate. Stability: 147 | (4) 382 | 347 | 390 |
| The same with 3% by weight of basic lead silicate-sulfate. Stability: 105 | 225 | 210 | 285 |
| The same with 3% by weight of lead chlorosilicate. Stability: 98 | 168 | 175 | 225 |

We claim:

1. A composition comprising a polyvinyl chloride polymer and in intimate admixture therewith from about 0.2 to about 1% by weight thereof of a dialkyl tin mercaptide of the general formula:

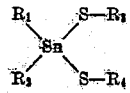

in which $R_1$, $R_2$, $R_3$ and $R_4$ are alkyl groups consisting solely of carbon and hydrogen atoms and containing not more than about 18 carbon atoms and from about 0.2 to 5% of a basic lead compound.

2. The composition of claim 1 wherein the basic lead compound is tribasic lead sulfate.

3. The composition of claim 1 wherein the basic lead compound is basic lead silicate-sulfate.

4. The composition of claim 1 wherein the basic lead compound is basic lead chlorosilicate.

5. A process for stabilizing a polymer consisting essentially of polyvinyl chloride which comprises incorporating in the polymer from 0.2 to 1% of a dialkyl tin mercaptide of the general formula:

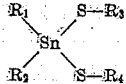

in which $R_1$, $R_2$, $R_3$ and $R_4$ are alkyl groups consisting solely of carbon and hydrogen atoms and containing not more than about 18 carbon atoms, and further adding to said dialkyl tin mercaptide in the polymer from 0.2 to 5% of a basic lead compound.

6. A process as claimed in claim 5 wherein the basic lead compound is a member selected from the group consisting of tribasic lead sulfate, basic lead silicate-sulfate and basic lead chlorosilicate.

References Cited in the file of this patent
UNITED STATES PATENTS

| 2,715,085 | Boger | Aug. 9, 1955 |
| 2,726,227 | Leistner et al. | Dec. 6, 1955 |
| 2,789,963 | Hecker | Apr. 23, 1957 |
| 2,807,603 | Parks et al. | Sept. 24, 1957 |